United States Patent
Ho et al.

(10) Patent No.: US 12,487,393 B2
(45) Date of Patent: Dec. 2, 2025

(54) FRONT LIGHT MODULE INCLUDING PLURALITY OF SETS OF MICROSTRUCTURES

(71) Applicant: E Ink Holdings Inc., Hsinchu (TW)

(72) Inventors: Chia Feng Ho, Hsinchu (TW); Jen-Yuan Chi, Hsinchu (TW); Yu-Nan Pao, Hsinchu (TW); Yen-Hao Chen, Hsinchu (TW); Yu-Chuan Wen, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/909,955

(22) Filed: Oct. 9, 2024

(65) Prior Publication Data
US 2025/0147219 A1 May 8, 2025

Related U.S. Application Data (60) Provisional application No. 63/596,622, filed on Nov. 7, 2023.

(51) Int. Cl.
*F21V 8/00* (2006.01)
*G02F 1/1335* (2006.01)

(52) U.S. Cl.
CPC ......... *G02B 6/0036* (2013.01); *G02B 6/0061* (2013.01); *G02F 1/133616* (2021.01)

(58) Field of Classification Search
CPC .. G02B 6/0016; G02B 6/0036; G02B 6/0058; G02B 6/0061; G02F 1/133616
See application file for complete search history.

(56) References Cited

U.S. PATENT DOCUMENTS

| | | | |
|---|---|---|---|
| 7,366,392 B2 | 4/2008 | Honma et al. | |
| 8,500,319 B2 | 8/2013 | Wang He | |
| 8,764,269 B2 | 7/2014 | Matsumoto et al. | |
| 9,329,425 B2 | 5/2016 | Chen et al. | |
| 11,112,559 B2 | 9/2021 | Kim et al. | |
| 2002/0054488 A1* | 5/2002 | Ohkawa | G02B 6/0068 362/613 |
| 2009/0244690 A1* | 10/2009 | Lee | G02B 6/0036 362/620 |
| 2009/0257245 A1* | 10/2009 | Kim | F21V 7/04 362/626 |
| 2015/0185394 A1* | 7/2015 | Huang | G02B 6/0028 362/610 |
| 2016/0274275 A1 | 9/2016 | Kim et al. | |
| 2016/0291231 A1 | 10/2016 | Jang et al. | |
| 2017/0123134 A1 | 5/2017 | Moon et al. | |
| 2018/0292594 A1 | 10/2018 | Lee | |

(Continued)

*Primary Examiner* — Keith G. Delahoussaye
(74) *Attorney, Agent, or Firm* — JCIPRNET (57) ABSTRACT

A front light module configured to be disposed on a display panel to illuminate the display panel is provided. The front light module includes a light source and a light guide plate. The light guide plate has a first surface facing away from the display panel, a second surface facing the display panel, and a light incident surface facing the light source. The light incident surface connects the first surface and the second surface. The first surface has multiple sets of optical micro-structures. Each of the sets of the optical micro-structures includes multiple optical micro-structures disposed or distributed asymmetrically.

13 Claims, 11 Drawing Sheets

(56) References Cited

U.S. PATENT DOCUMENTS

| | | |
|---|---|---|
| 2019/0265522 A1 | 8/2019 | Chen et al. |
| 2020/0040255 A1 | 2/2020 | Park et al. |
| 2021/0200002 A1 | 7/2021 | Kim et al. |
| 2021/0333826 A1* | 10/2021 | Liao ................. G02B 6/0068 |
| 2024/0192434 A1* | 6/2024 | Lee .................. G02B 6/0068 |
| 2025/0076560 A1* | 3/2025 | Liu .................. G02B 6/0036 |

* cited by examiner

FRONT LIGHT MODULE INCLUDING PLURALITY OF SETS OF MICROSTRUCTURES

CROSS-REFERENCE TO RELATED APPLICATION

This application claims the priority benefit of U.S. provisional application Ser. No. 63/596,622, filed on Nov. 7, 2023. The entirety of the above-mentioned patent application is hereby incorporated by reference herein and made a part of this specification.

BACKGROUND

Technical Field

The disclosure relates to a light source module, and more particularly, to a front light module.

Description of Related Art

For a non-self-luminous display panel, a light source module may be used to illuminate the non-self-luminous display panel, so that a user may still clearly see an image screen displayed by the non-self-luminous display panel under low ambient light intensity. For example, an electrophoretic display is a non-self-luminous display panel, which is a reflective display panel, and may be used with a front light module to illuminate the electrophoretic display.

The front light module usually includes a light source and a light guide plate, and micro-structures on the light guide plate enables light from the light source to be incident to the display panel at a small angle, thereby improving color saturation of the display. The vertical reflective light caused by the micro-structures passes through a multi-layer material interface, resulting in a large amount of reflective light at the interface, which causes human eyes to see rays in a dark image, resulting in defects in optical taste.

In addition, a current collimation light guide plate structure may increase the light towards a direction of the display and improve brightness of a display module. However, during a light transmission process, the emitted light at a consistent angle will be accumulated through refraction and reflection of continuous collimation dot micro-structures, resulting in obvious bright lines or dark lines that change with an angle of a viewer, thereby affecting screen performance of the display.

SUMMARY

The disclosure provides a front light module, which may provide uniform illumination to a display panel, thereby generating a uniform display image.

An embodiment of the disclosure provides a front light module configured to be disposed on a display panel to illuminate the display panel. The front light module includes a light source and a light guide plate. The light guide plate has a first surface facing away from the display panel, a second surface facing the display panel, and a light incident surface facing the light source. The light incident surface connects the first surface and the second surface. The first surface has multiple sets of optical micro-structures, and each of the sets of the optical micro-structures includes multiple optical micro-structures disposed or distributed asymmetrically.

In the front light module according to the embodiments of the disclosure, the first surface of the light guide plate has the sets of the optical micro-structures, and each of the sets of the optical micro-structures includes the optical micro-structures disposed or distributed asymmetrically. Therefore, the light reflected downward by the optical micro-structure changes from uniformity to scattering, which may effectively suppress the bright lines or the dark lines generated on the screen in the conventional technology. Therefore, the front light module according to the embodiments of the disclosure may provide uniform illumination to the display panel, thereby generating the uniform display image.

DETAILED DESCRIPTION OF DISCLOSED EMBODIMENTS

Figure 1:
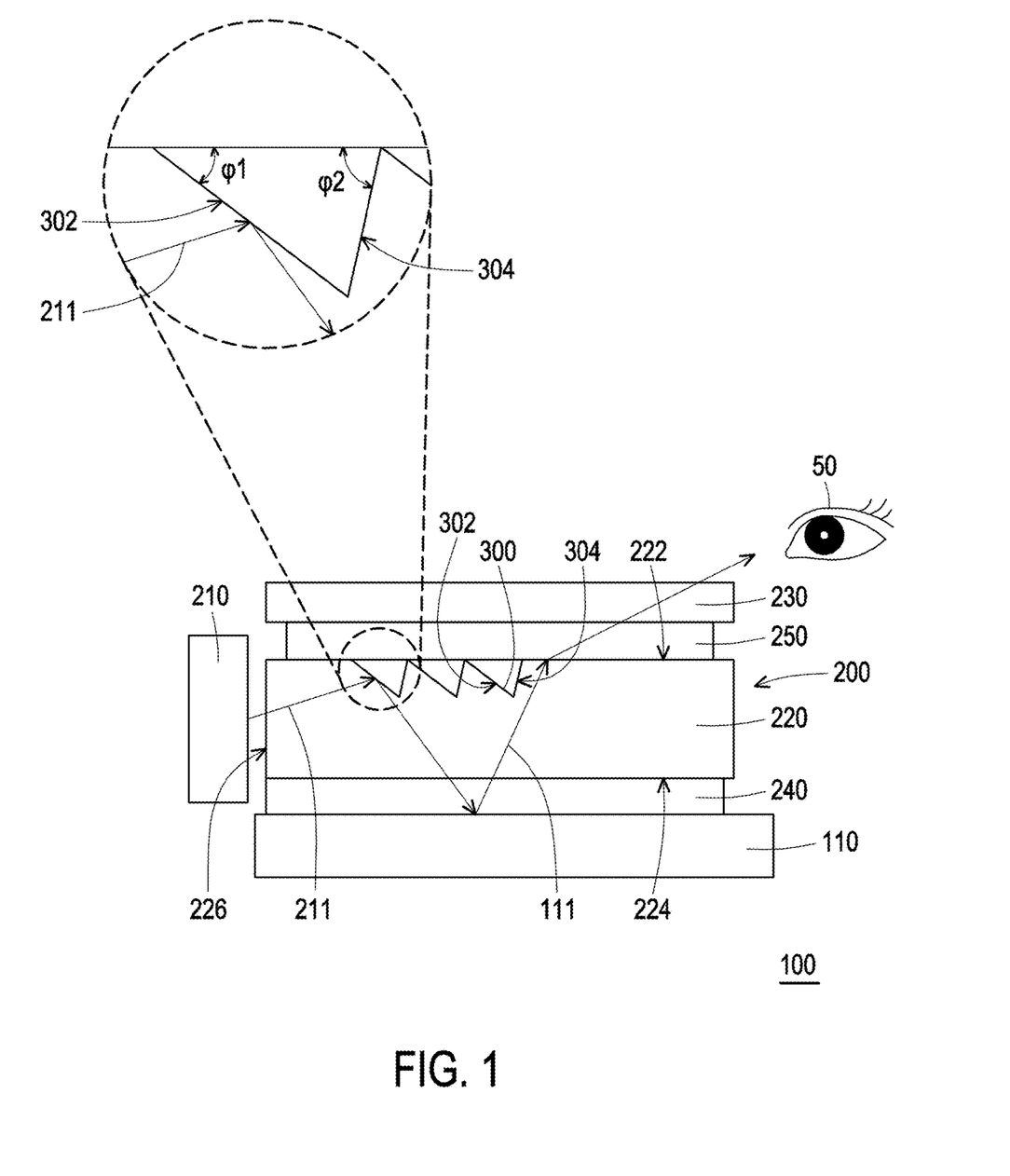
FIG. 1 is a schematic cross-sectional view of a display device according to an embodiment of the disclosure.
Figure 2:
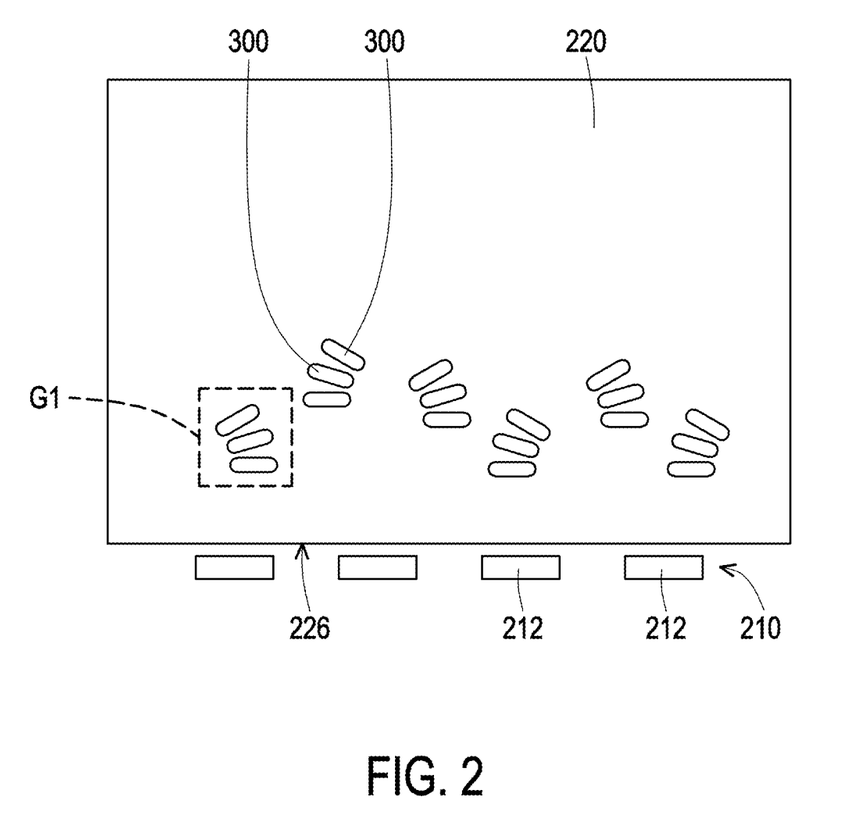
FIG. 2 is a schematic top view of a front light module in the display device in FIG. 1.

FIG. 1 is a schematic cross-sectional view of a display device according to an embodiment of the disclosure. FIG. 2 is a schematic top view of a front light module in the display device in FIG. 1. Referring to FIG. 1 and FIG. 2, a display device 100 in this embodiment includes a display panel 110 and a front light module 200. In this embodiment, the display panel 110 is, for example, an electrophoretic display panel. The front light module 200 is configured to be disposed on the display panel 110 to illuminate the display panel 110. The front light module 200 includes a light source 210 and a light guide plate 220. The light guide plate 220 has a first surface 222 facing away from the display panel 110, a second surface 224 facing the display panel 110, and a light incident surface 226 facing the light source 210. The light incident surface 226 connects the first surface 222 and the second surface 224. The first surface 222 has multiple sets of optical micro-structures 300, and each of the sets of the optical micro-structures 300 includes the optical micro-structures 300 disposed or distributed asymmetrically. For example, in FIG. 2, three adjacent optical micro-structures 300 may form an optical micro-structure group G1, and the three optical micro-structures 300 in each of the optical micro-structure groups G1 are disposed or distributed asymmetrically. FIG. 2 shows several optical micro-structure groups G1 as representatives. In fact, the first surface 222 may have more optical micro-structure groups G1. The optical micro-structure groups G1 may also be distributed throughout the first surface 222 or distributed in an area of the first surface 222 close to the light incident surface 226.

In this embodiment, the light source 210 is configured to emit a light beam 211. After the light beam 211 enters the light guide plate 220 through the light incident surface 226, the light beam 211 irradiated on the optical micro-structures 300 is reflected by the optical micro-structures 300 to the display panel 110. The display panel 110 reflects the light beam 211 into an image beam 111, and the image beam 111 penetrates through the light guide plate 220 to be transmitted to an eye 50 of a user. In this embodiment, the light source 210 includes multiple light emitting elements 212 arranged in a row along the light incident surface 226. The light emitting elements 212 are, for example, light emitting diodes, but the disclosure is not limited thereto.

In this embodiment, a longitudinal section of each of the optical micro-structures 300 is triangular, as shown in FIG. 1, which has a first inclined surface 302 and a second inclined surface 304 opposite to each other. An inclination angle $\varphi 1$ of the first inclined surface 302 relative to the second surface 224 falls within a range of 20 degrees to 40 degrees, and an inclination angle $\varphi 2$ of the second inclined surface 304 relative to the second surface 224 falls in a range of 60 degrees to 89 degrees. The first inclined surface 302 is located between the light incident surface 226 and the second inclined surface 304. In this embodiment, the optical micro-structure 300 is, for example, a recessed structure. However, in other embodiments, the optical micro-structure 300 may also be a protruding structure.

Figure 3:
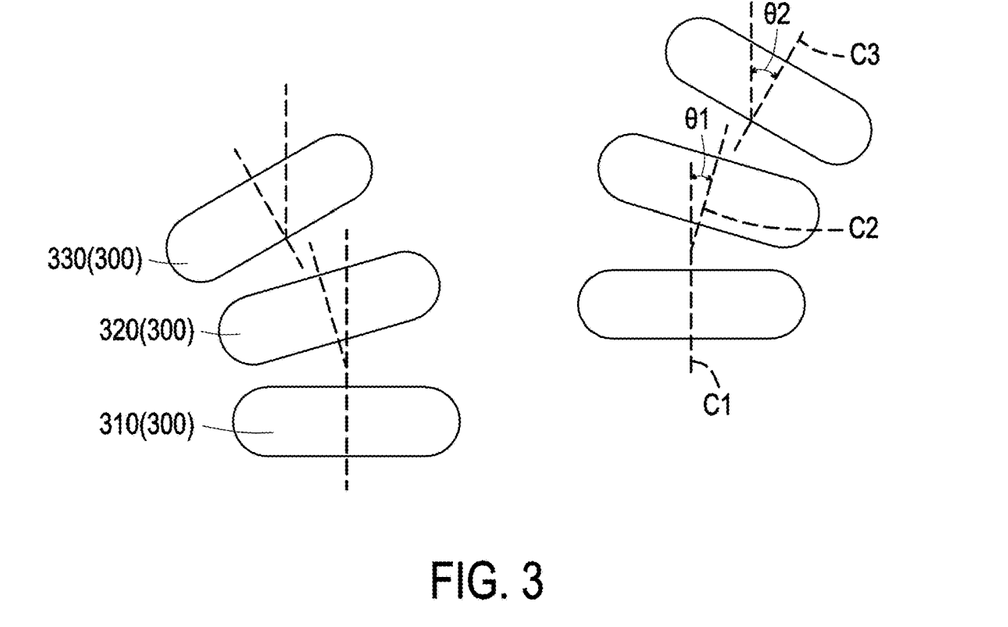
FIG. 3 is a schematic enlarged view of two sets of optical micro-structures in FIG. 2.

FIG. 3 is a schematic enlarged view of two sets of optical micro-structures in FIG. 2.

Referring to FIGS. 1 to 3, in this embodiment, each of the sets of the optical micro-structures 300 (i.e., each of the optical micro-structure groups G1) includes a first optical micro-structure 310, a second optical micro-structure 320, and a third optical micro-structure 330. A center axis C2 of the second optical micro-structure 320 and a center axis C3 of the third optical micro-structure 330 rotate relative to a center axis C1 of the first optical micro-structure 310. In this embodiment, in each of the sets of the optical micro-structures 300, a rotation angle $\theta 1$ of the center axis C2 of the second optical micro-structure 320 relative to the center axis C1 of the first optical micro-structure 310 is greater than 0 degrees and less than or equal to 30 degrees, and a rotation angle $\theta 2$ of the center axis C3 of the third optical micro-structure 330 relative to the center axis C1 of the first optical micro-structure 310 is greater than or equal to 5 degrees and less than or equal to 60 degrees. In addition, in this embodiment, the rotation angle $\theta 2$ is greater than the rotation angle $\theta 1$.

In this embodiment, a degree and a direction of rotation of the center axes C2 and C3 of the second optical micro-structure 320 and the third optical micro-structure 330 of the adjacent two sets of the optical micro-structures 300 relative to the center axis C1 of the first optical micro-structure 310 thereof are symmetrical. For example, in the two sets of the optical micro-structures 300 as shown in FIG. 3, the second optical micro-structure 320 and the third optical micro-structure 330 of the left set of the optical micro-structures 300 rotate counterclockwise relative to the first optical micro-structure 310, and the second optical micro-structure 320 and the third optical micro-structure 330 of the right set of the optical micro-structures 300 rotate clockwise relative to the first optical micro-structure 310. Therefore, the direction and the degree of rotation of the left and right sets of the optical micro-structures 300 are symmetrical, and distances between the two sets of the optical micro-structures 300 and the light incident surface 226 may be the same or different.

In the front light module 200 in this embodiment, the first surface 222 of the light guide plate 220 has the sets of the optical micro-structures 300, and each of the sets of the optical micro-structures 300 includes the optical micro-structures 300 disposed or distributed asymmetrically. Therefore, the light reflected downward by the optical micro-structure 300 changes from uniformity to scattering, which may effectively suppress bright lines or dark lines generated on a screen in the conventional technology. Therefore, the front light module 200 in this embodiment may provide uniform illumination to the display panel 110, thereby generating a uniform display image.

In this embodiment, the front light module 200 may further include a cover plate 230, an optically transparent adhesive 240, and an optically transparent adhesive 250. The optically transparent adhesive 240 bonds the light guide plate 220 and the display panel 110, and the optically transparent adhesive 250 bonds the light guide plate 220 and the cover plate 230. The cover plate 230 is, for example, an anti-glare layer or a protective cover plate.

Figure 4:
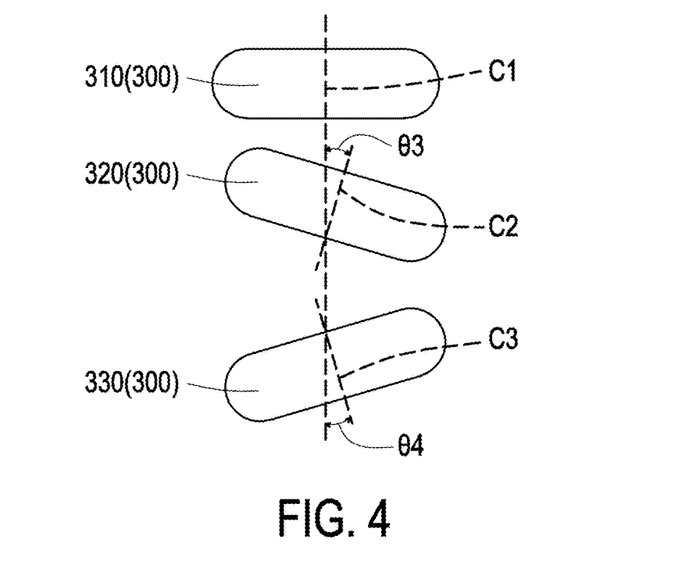
FIG. 4 is a schematic top view of one set of optical micro-structures in a front light module according to another embodiment of the disclosure.

FIG. 4 is a schematic top view of one set of optical micro-structures in a front light module according to another embodiment of the disclosure. Referring to FIG. 4, in this embodiment, in each of the sets of the optical micro-structures 300, the degree and the direction of rotation of the center axis C2 of the second optical micro-structure 320 and the center axis C3 of the third optical micro-structure 330 relative to the center axis C1 of the first optical micro-structure 310 are symmetrical. In this embodiment, a rotation angle $\theta 3$ of the center axis C2 of the second optical micro-structure 320 relative to the center axis C1 of the first optical micro-structure 310 is greater than or equal to 5 degrees and less than or equal to 60 degrees, and a rotation angle $\theta 4$ of the center axis C3 of the third optical micro-structure 330 relative to the center axis C1 of the first optical micro-structure 310 is less than or equal to $-5$ degrees and greater than or equal to $-60$ degrees. In this embodiment, an absolute value of the rotation angle $\theta 3$ is equal to an absolute value of the rotation angle $\theta 4$. However, in other embodiments, the absolute value of the rotation angle $\theta 3$ may not be equal to the absolute value of the rotation angle $\theta 4$. Different positive and negative values of the rotation angle $\theta 3$ and the rotation angle $\theta 4$ mean that one rotates clockwise, while the other rotates counterclockwise. When the positive and negative values of the two are different, but the absolute values of the two are the same, it means that the degree and the direction of rotation of the two are symmetrical.

Figure 5:
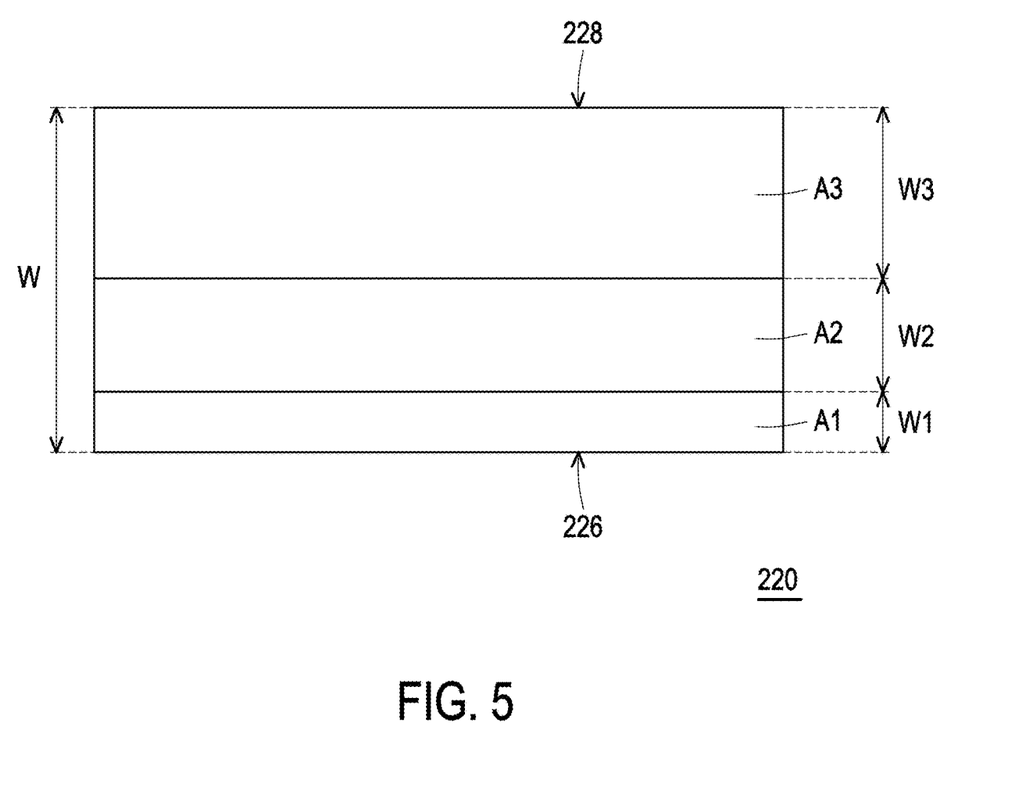
FIG. 5 is a schematic view of partitions of a light guide plate in a front light module according to still another embodiment of the disclosure.
Figure 6A:
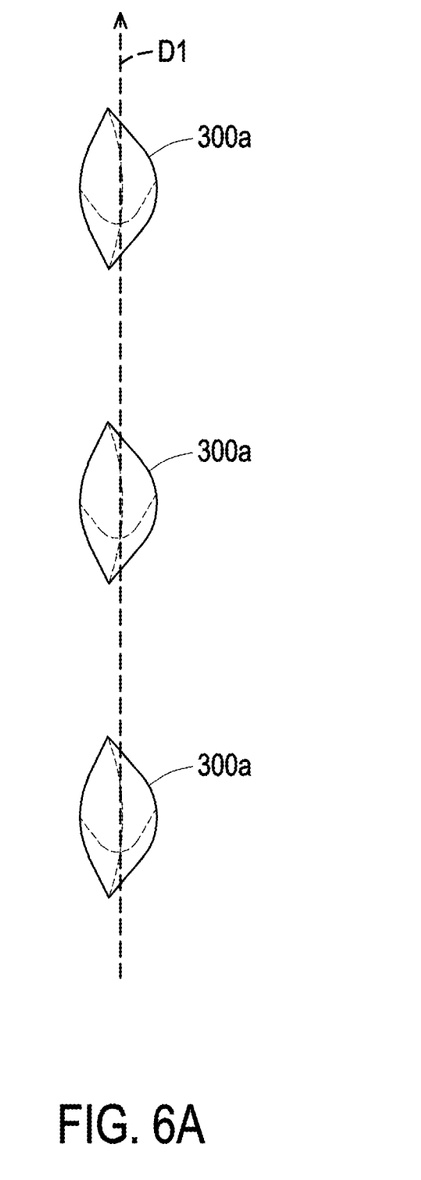
FIG. 6A is a schematic top view of one set of regular optical micro-structures.

FIG. 5 is a schematic view of partitions of a light guide plate in a front light module according to still another embodiment of the disclosure. Referring to FIGS. 1 and 5, in this embodiment, the light guide plate 220 is divided into a dot structure change area A1, a hybrid structure area A2, and a rear section area A3 in sequence from the light incident surface 226 to another surface 228 relative to the light incident surface 226. In the rear section area A3, the first surface 222 has multiple sets of regular optical micro-structures 300a. The regular optical micro-structures 300a in each of the sets of the regular optical micro-structures 300a are arranged in a straight line, as shown in FIG. 6A, which is one set of the regular optical micro-structures 300a. In the hybrid structure area A2, the first surface 222 has the sets of the regular optical micro-structures 300a and the sets of the optical micro-structures 300. Each of the sets of the optical micro-structures 300 is disposed or distributed asymmetrically, which may be the optical micro-structures 300 as shown in FIG. 4 or the optical micro-structures to be introduced in the following embodiments. That is to say, in the hybrid structure area A2, the sets of the regular optical micro-structures 300a and the sets of the optical micro-structures 300 are disposed mixedly, and the sets of the regular optical micro-structures 300a and the sets of the optical micro-structures 300 may be disposed staggeredly. In addition, in the dot structure change area A1, the first surface 222 has the sets of the optical micro-structures 300 but does not have the sets of the regular optical micro-structures 300a. In an embodiment, a width W1 of the dot structure change area A1 in a direction perpendicular to the light incident surface 226 accounts for ⅙ of a width W of the light guide plate 220 in the direction perpendicular to the light incident surface 226. A width W2 of the hybrid structure area A2 in the direction perpendicular to the light incident surface 226 accounts for ⅖ of the width W. A width W3 of the rear section area A3 in the direction perpendicular to the light incident surface 226 accounts for ⅗ of the width W. However, the disclosure is not limited thereto.

Figure 6B:
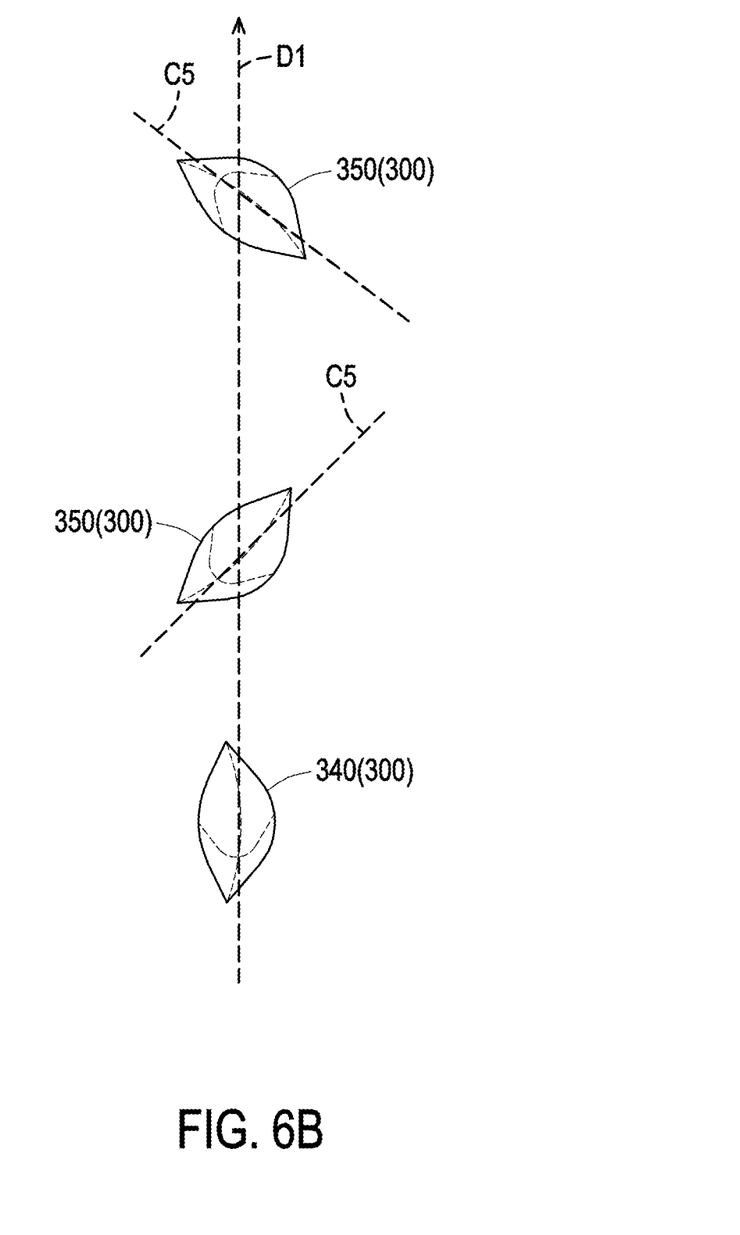
FIG. 6B is a schematic top view of one set of optical micro-structures using a structural rotation design.

In this embodiment, each of the sets of the optical micro-structures 300 includes a main optical micro-structure 340 and N secondary optical micro-structures 350 that change relative to the main optical micro-structure 340, where N falls in a range of 0 to 3, and an example in FIG. 6B is N=2. In this embodiment, a way the N secondary optical micro-structures 350 in each of the sets of the optical micro-structures 300 change relative to the main optical micro-structure 340 include at least one of a structural rotation design, a structural stretching design, and a structural misalignment design, and in FIG. 6B, the way including the structural rotation design is taken as an example. In this embodiment, a range of rotation of a center axis C5 of the N secondary optical micro-structures 350 in each of the sets of the optical micro-structures 300 relative to a direction D1 perpendicular to the light incident surface 226 falls within a range of ±1 degree to ±89 degrees. In an embodiment, N is greater than or equal to 2, and rotation angles of the two adjacent secondary optical micro-structures 350 are different to prevent the light from continuously passing through the secondary optical micro-structures of the same design and from accumulating the emitted light at a consistent angle. The rotation design in this embodiment enables the light to be incident to incident surfaces of different shapes, generating the emitted light at various angles, achieving decrease in the emitted light at the consistent angle, thereby improving uniformity of illumination.

In addition, the sets of the regular optical micro-structures 300a refer to the fact that the regular optical micro-structures 300a in each of the sets of the regular optical micro-structures 300a are arranged in the straight line without any one of the structural rotation design, the structural stretching design, or the structural misalignment design. For example, the regular optical micro-structures 300a in each of sets of the regular optical micro-structures 300a adopt the same structure.

Figure 7:
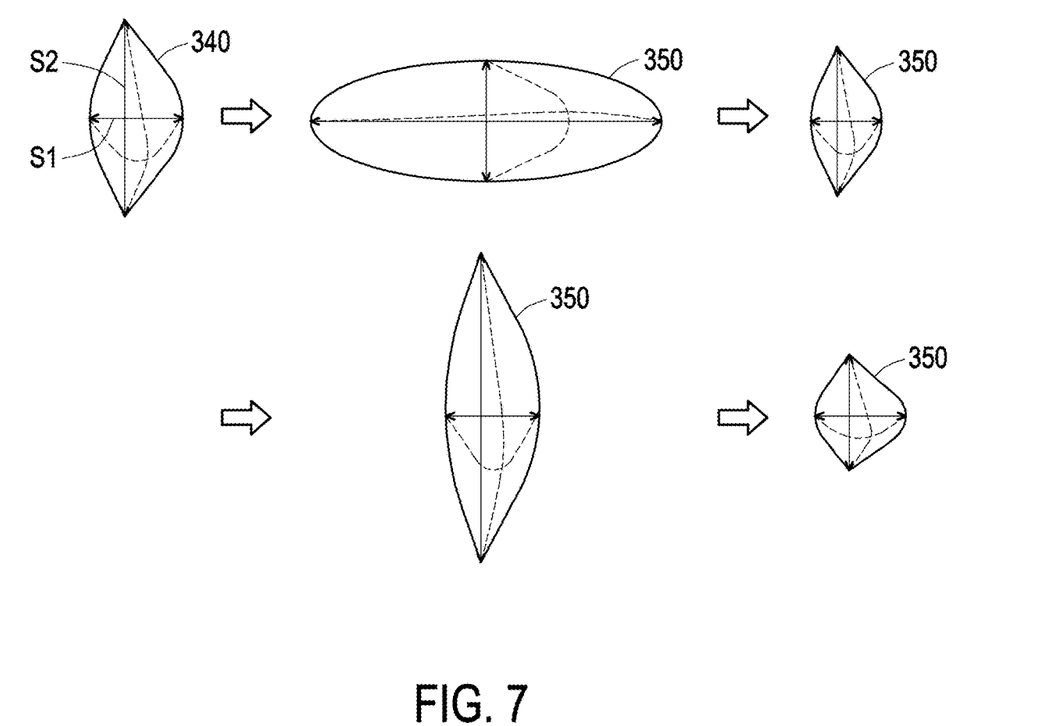
FIG. 7 illustrates a structural stretching design of a secondary optical micro-structure relative to a main optical micro-structure.

FIG. 7 illustrates a structural stretching design of a secondary optical micro-structure relative to a main optical micro-structure. Referring to FIG. 7, the structural stretching design is to perform a stretching or compression design along a long axis or a short axis of the secondary optical micro-structure 350. A stretching length or a compression length of the long axis or the short axis is not greater than 3 times of that of the main optical micro-structure. For example, the two secondary optical micro-structures 350 in the first row in FIG. 7 respectively stretch and compress a short axis S1 of the main optical micro-structure 340, while the two secondary optical micro-structures 350 in the second row in FIG. 7 respectively stretch and compress the long axis S2 of the main optical micro-structure 340. The long and short axes of the secondary optical micro-structure 350 are stretched at different proportions, so that the incident light may be transmitted to the rear micro-structure to varying degrees.

Figure 8:
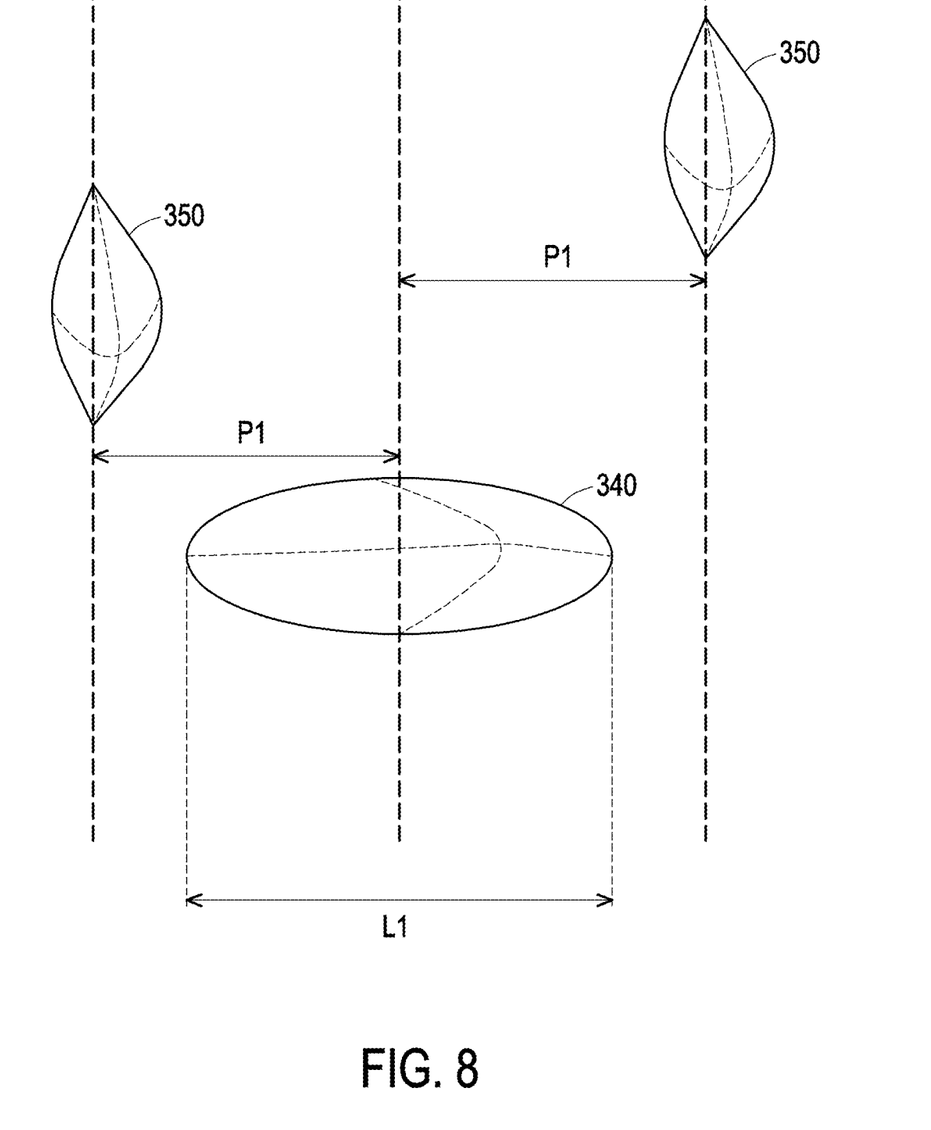
FIG. 8 illustrates both a structural misalignment design and a structural stretching design of a secondary optical micro-structure relative to a main optical micro-structure.

FIG. 8 illustrates both a structural misalignment design and a structural stretching design of a secondary optical micro-structure relative to a main optical micro-structure. Referring to FIGS. 1 and 8, in this embodiment, the way the N secondary optical micro-structures 350 in each of the sets of the optical micro-structures 300 change relative to the main optical micro-structure 340 include both the structural stretching design and the structural misalignment design. In this embodiment, the structural stretching design may be performed on the main optical micro-structure 340 relative to the regular optical micro-structure 300a. For example, a short axis of the regular optical micro-structure 300a is elongated to form the main optical micro-structure 340, while a misalignment distance P1 of the secondary optical micro-structure 350 relative to the main optical micro-structure 340 is greater than half of a stretched length L1 of the axis of the secondary optical micro-structure 350 relative to the main optical micro-structure 340 in a direction of the misalignment distance P1. The structural misalignment design of the secondary optical micro-structure 350 prevents the light from being continuously incident to more than two optical micro-structures and reduces a situation where the incident light continuously passes through the incident surface of the same shape to form the emitted light at the consistent angle. Therefore, the structural misalignment design in this embodiment may effectively improve the uniformity of illumination.

Figure 9A:
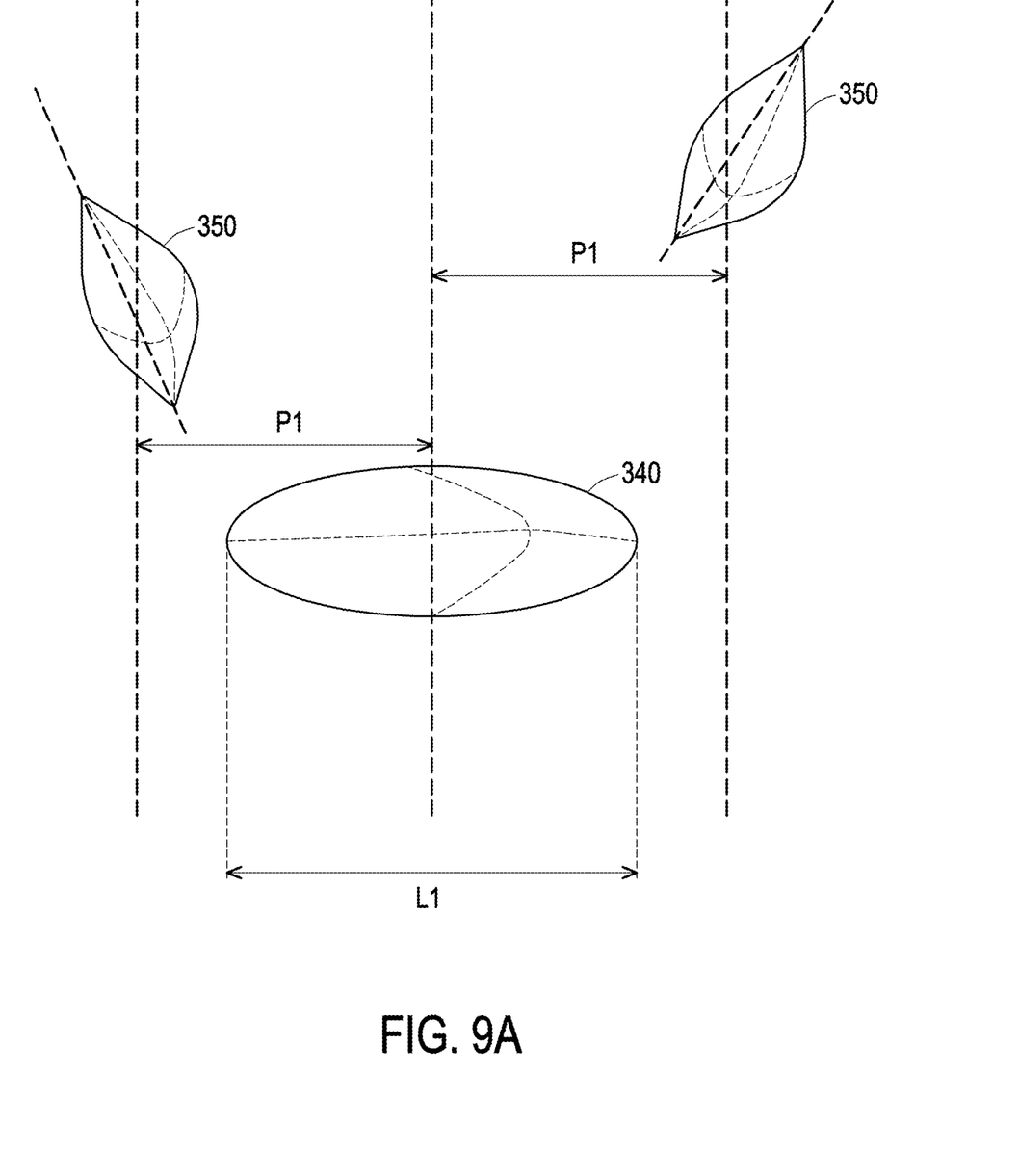
FIG. 9A illustrates that a way a secondary optical micro-structure changes relative to a main optical micro-structure includes a structural stretching design, a structural misalignment design, and a structural rotation design together.
Figure 9B:
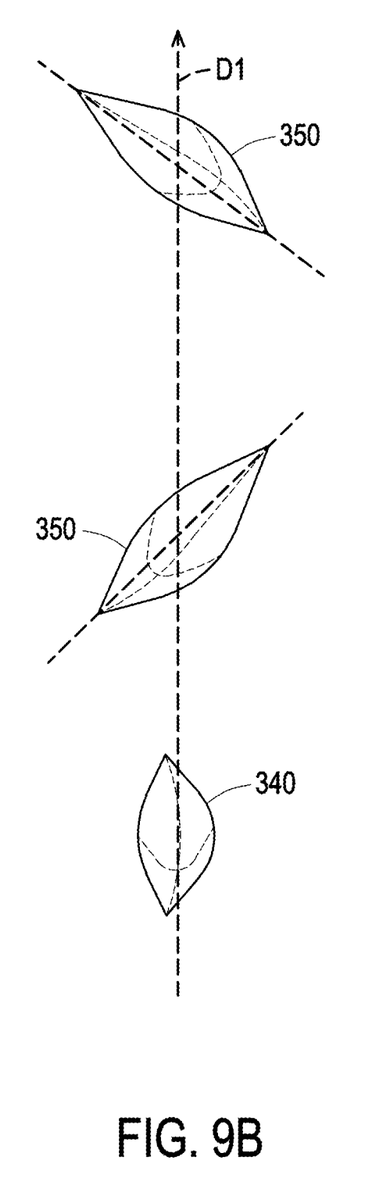
FIG. 9B illustrates that a way a secondary optical micro-structure changes relative to a main optical micro-structure includes both a structural rotation design and a structural stretching design.
Figure 9C:
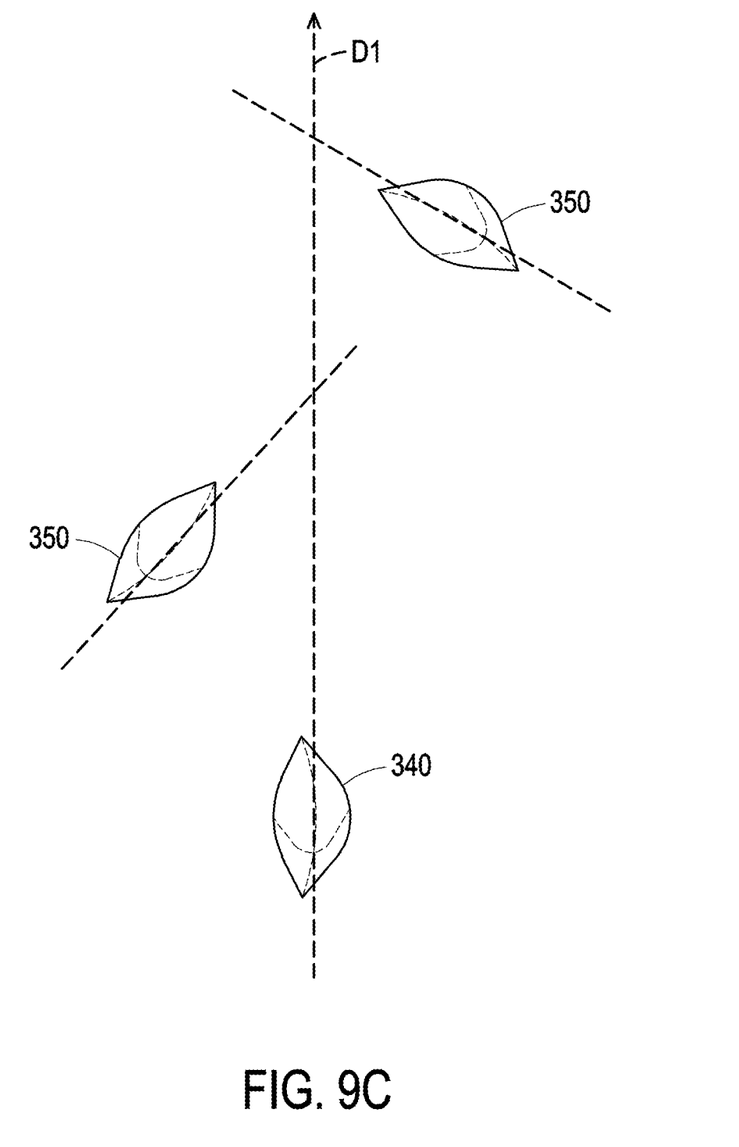
FIG. 9C illustrates that a way a secondary optical micro-structure changes relative to a main optical micro-structure includes both a structural rotation design and a structural misalignment design.

In other embodiments, FIG. 9A illustrates that the way the secondary optical micro-structures 350 change relative to the main optical micro-structure 340 includes the structural stretching design, the structural misalignment design, and the structural rotation design together. FIG. 9B illustrates that the way the secondary optical micro-structures 350 change relative to the main optical micro-structure 340 includes both the structural rotation design and the structural stretching design. FIG. 9C illustrates that the way the secondary optical micro-structure 350 change relative to the main optical micro-structure 340 includes both the structural rotation design and the structural misalignment design.

Based on the above, in the front light module according to the embodiments of the disclosure, the first surface of the light guide plate has the sets of the optical micro-structures, and each of the sets of the optical micro-structures includes the optical micro-structures disposed or distributed asymmetrically. Therefore, the light reflected downward by the optical micro-structure changes from uniformity to scattering, which may effectively suppress the bright lines or the dark lines generated on the screen in the conventional technology. Therefore, the front light module according to the embodiments of the disclosure may provide uniform illumination to the display panel, thereby generating the uniform display image.

What is claimed is:

1. A front light module configured to be disposed on a display panel to illuminate the display panel, wherein the front light module comprises:

a light source; and a light guide plate having a first surface facing away from the display panel, a second surface facing the display panel, and a light incident surface facing the light source, wherein the light incident surface connects the first surface and the second surface, the first surface has a plurality of sets of optical micro-structures, and each of the sets of the optical micro-structures comprises a plurality of optical micro-structures disposed or distributed asymmetrically, wherein each of the sets of the optical micro-structures comprises a main optical micro-structure and N secondary optical micro-structures that change relative to the main optical micro-structure, a way that the N secondary optical micro-structures change relative to the main optical micro-structure comprises a structural rotation design, a structural stretching design, and a structural misalignment design, and the structural stretching design is to perform a stretching or compression design along a long axis or a short axis of the secondary optical micro-structures, wherein a stretching length of the long axis or the short axis or a compression length of the long axis or the short axis is not greater than 3 times of a stretching length of the main optical micro-structure or a compression length of the main optical micro-structure.

2. The front light module according to claim 1, wherein a longitudinal section of each of the optical micro-structures is triangular with a first inclined surface and a second inclined surface opposite to each other, an inclination angle of the first inclined surface relative to the second surface falls within a range of 20 degrees to 40 degrees, and an inclination angle of the second inclined surface relative to the second surface falls within a range of 60 degrees to 89 degrees, wherein the first inclined surface is located between the light incident surface and the second inclined surface.

3. The front light module according to claim 1, wherein each of the sets of the optical micro-structures comprises a first optical micro-structure, a second optical micro-structure, and a third optical micro-structure, and a center axis of the second optical micro-structure and a center axis of the third optical micro-structure rotate relative to a center axis of the first optical micro-structure.

4. The front light module according to claim 3, wherein in each of the sets of the optical micro-structures, a degree and a direction of rotation of the center axis of the second optical micro-structure and the center axis of the third optical micro-structure rotate relative to the center axis of the first optical micro-structure are symmetrical.

5. The front light module according to claim 3, wherein a degree and a direction of rotation of the center axes of the second optical micro-structure and the third optical micro-structure of the adjacent two sets of the optical micro-structures relative to the center axis of the first optical micro-structure are symmetrical.

6. The front light module according to claim 3, wherein in each of the sets of the optical micro-structures, a rotation angle of the center axis of the second optical micro-structure relative to the center axis of the first optical micro-structure is greater than 0 degrees and less than or equal to 30 degrees, and a rotation angle of the center axis of the third optical micro-structure relative to the center axis of the first optical micro-structure is greater than or equal to 5 degrees and less than or equal to 60 degrees.

7. The front light module according to claim 6, wherein in each of the sets of the optical micro-structures, the rotation angle of the center axis of the third optical micro-structure relative to the center axis of the first optical micro-structure is greater than the rotation angle of the center axis of the second optical micro-structure relative to the center axis of the first optical micro-structure.

8. The front light module according to claim 6, wherein a rotation angle of the center axis of the second optical micro-structure relative to the center axis of the first optical micro-structure is greater than 5 degrees and less than or equal to 60 degrees, and a rotation angle of the center axis of the third optical micro-structure relative to the center axis of the first optical micro-structure is greater than or equal to −5 degrees and less than or equal to −60 degrees.

9. The front light module according to claim 1, wherein the light guide plate is divided into a dot structure change area, a hybrid structure area, and a rear section area in sequence from the light incident surface to another surface relative to the light incident surface, in the rear section area, the first surface has a plurality of sets of regular optical micro-structures, and the regular optical micro-structures in each of the sets of the regular optical micro-structures are arranged in a straight line, in the hybrid structure area, the first surface has the sets of the regular optical micro-structures and the sets of the optical micro-structures, and in the dot structure change area, the first surface has the sets of the optical micro-structures but does not have the sets of the regular optical micro-structures.

10. The front light module according to claim 9, wherein the N is falls in a range of 0 to 3.

11. The front light module according to claim 1, wherein a range of rotation of a center axis of the N secondary optical micro-structures relative to a direction perpendicular to the light incident surface falls within a range of ±1 degree to ±89 degrees.

12. The front light module according to claim 11, wherein N is greater than or equal to 2, and rotation angles of the two adjacent secondary optical micro-structures are different.

13. The front light module according to claim 1, wherein the way the N secondary optical micro-structures change relative to the main optical micro-structure comprises both the structural stretching design and the structural misalignment design, and a misalignment distance of the secondary optical micro-structures relative to the main optical micro-structure is greater than half of a stretched length of the axis of the secondary optical micro-structures relative to the main optical micro-structure in a direction of the misalignment distance.

* * * * *